(12) United States Patent
Hauck (10) Patent No.: US 12,055,200 B2
(45) Date of Patent: Aug. 6, 2024

(54) DRIVE TRAIN FOR A MOTOR VEHICLE WITH A PLANETARY GEAR TRANSMISSION

(71) Applicant: BorgWarner Inc., Auburn Hills, MI (US)

(72) Inventor: Hans Juergen Hauck, Schwabisch Hall (DE)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 18/486,294

(22) Filed: Oct. 13, 2023

(65) Prior Publication Data
US 2024/0133449 A1 Apr. 25, 2024
US 2024/0229901 A9 Jul. 11, 2024

(30) Foreign Application Priority Data

Oct. 19, 2022 (DE) .......................... 102022003864.1

(51) Int. Cl.
*F16H 3/66* (2006.01)
*F16D 21/06* (2006.01)
*F16D 25/0638* (2006.01)

(52) U.S. Cl.
CPC ....... *F16H 3/66* (2013.01); *F16D 2021/0661* (2013.01); *F16D 25/0638* (2013.01);
(Continued)

(58) Field of Classification Search
CPC .............. F16H 3/66; F16H 2200/2005; F16H 2200/2035; F16D 13/385;
(Continued)

(56) References Cited

U.S. PATENT DOCUMENTS 5,562,565 A * 10/1996 Moroto .................. B60K 6/365
903/952
5,856,709 A 1/1999 Ibaraki et al.
(Continued)

FOREIGN PATENT DOCUMENTS

DE 10140424 A1 2/2003
DE 102016206967 A1 * 10/2017
DE 102019211678 A1 2/2021

OTHER PUBLICATIONS

Merriam Webster Dictionary for definition of nested (Year: 2024).*
(Continued)

*Primary Examiner* — Jacob S. Scott
*Assistant Examiner* — Farhana Pervin
(74) *Attorney, Agent, or Firm* — Howard & Howard Attorneys PLLC (57) ABSTRACT

A drive train for a motor vehicle includes a planetary gear transmission with three elements, specifically a sun gear, a planet carrier with at least one planet gear, and a ring gear. A first element of the three forms an input side of the planetary gear transmission, via which the input torque of an electric motor can be introduced into the planetary gear transmission, a second element forms an output side of the planetary gear transmission, and a third element can be electively fixed to a stationary housing via a braking device. The drive train also includes a clutch device, by means of which two of the elements can be electively fixed to one another in such a way that the planetary gear transmission performs a block rotation.

19 Claims, 1 Drawing Sheet

(52) U.S. Cl.
CPC ............... *F16H 2200/0034* (2013.01); *F16H 2200/2005* (2013.01); *F16H 2200/2035* (2013.01)

(58) Field of Classification Search
CPC ............. F16D 2021/0692; F16D 13/52; F16D 13/683; F16D 25/0638; F16D 25/123; F16D 2021/0661; F16D 2048/0293; F16D 2300/06

See application file for complete search history.

(56) References Cited

U.S. PATENT DOCUMENTS

| | | | |
|---|---|---|---|
| 6,966,860 | B2 | 11/2005 | Heitmann et al. |
| 2008/0108468 | A1* | 5/2008 | Iwasaki ................ F16D 21/06 |
| | | | 475/31 |
| 2009/0275438 | A1* | 11/2009 | Kersting ............... B60K 6/445 |
| | | | 903/910 |
| 2015/0224983 | A1* | 8/2015 | Hiasa .................... B60K 6/445 |
| | | | 903/917 |
| 2016/0167504 | A1* | 6/2016 | Kanada ................. B60K 6/365 |
| | | | 475/5 |
| 2018/0252300 | A1* | 9/2018 | Okamoto ............... F16H 3/728 |
| 2020/0271198 | A1* | 8/2020 | Breinesberger ......... F16H 3/663 |
| 2021/0001705 | A1 | 1/2021 | Park et al. |
| 2021/0310543 | A1* | 10/2021 | Numata ................. F16H 59/38 |

OTHER PUBLICATIONS

Machine translation of DE 102019211678 A1 (Year: 2021).*
English language abstract for DE 101 40 424 A1 extracted from espacenet.com database on Nov. 21, 2023, 2 pages.
Machine-assisted English language abstract and machine-assisted English language translation for DE 10 2019 211 678 A1 extracted from espacenet.com database on Nov. 21, 2023, 21 pages.

* cited by examiner

DRIVE TRAIN FOR A MOTOR VEHICLE WITH A PLANETARY GEAR TRANSMISSION

CROSS-REFERENCE TO RELATED APPLICATIONS

This application claims priority pursuant to 35 U.S.C. 119(a) to German Application No. 102022003864.1, filed Oct. 19, 2022, which application is incorporated herein by reference in its entirety.

FIELD

The present invention relates to a drive train for a motor vehicle with a planetary gear transmission which comprises three elements, specifically a sun gear, a planet carrier with at least one planet gear, and a ring gear, of which the first element forms an input side of the planetary gear transmission, via which the input torque can be introduced into the planetary gear transmission, a second element forms an output side of the planetary gear transmission, wherein the planetary gear transmission is shiftable in such a way that this enables two transmission stages.

SUMMARY

It is an object of the present invention to provide a drive train for a motor vehicle, in particular a drive train for a motor vehicle driven by an electric motor, which enables a shiftable planetary gear transmission to achieve two transmission stages, wherein the drive train is to be particularly compactly constructed and reliably operable.

This object is achieved by the features specified in claim 1. Advantageous embodiments of the invention are the subject matter of the dependent claims.

The drive train according to the invention is designed for a motor vehicle and preferably forms a drive train for a motor vehicle driven by an electric motor. The drive train comprises a planetary gear transmission, wherein the planetary gear transmission comprises three elements, specifically a sun gear, a planet carrier with at least one planet gear, and a ring gear. Of said three elements, a first element forms an input side of the planetary gear transmission, via which the input torque of an electric motor or other input of the motor vehicle can be introduced into the planetary gear transmission. On the other hand, a second element of the planetary gear transmission forms an output side of the planetary gear transmission, via which the output torque of the planetary gear transmission can be supplied to a subsequent component of the drive train. A third element of the planetary gear transmission, on the other hand, can be electively fixed to a stationary housing via a braking device. The braking device is preferably a multiple disc brake. Furthermore, a clutch device is provided, by means of which two of the elements of the planetary gear transmission can be electively fixed to each other in such a way that the planetary gear transmission performs a so-called block rotation. Thus, the planetary gear transmission of the drive train according to the invention for a motor vehicle is equipped with two transmission stages, specifically a first transmission stage, in which the clutch device is open and the braking device is closed, and a second transmission stage, in which the clutch device is closed and the braking device is open. The planetary gear transmission, clutch device and braking device can have a particularly compact construction in order to create a compact drive train for a motor vehicle driven by an electric motor.

In a preferred embodiment of the drive train according to the invention, the second element or an output gear connected thereto for conjoint rotation is fixed to the housing in the axial direction via a fixed bearing. The fixed bearing is preferably formed substantially by a radial bearing and/or rolling bearing. It can also be said that the second element or the output gear connected thereto for conjoint rotation is mounted directly on the housing via the fixed bearing and is fixed in the axial direction. The first element and the third element, on the other hand, are fixed to the stationary housing in the axial direction only indirectly via the second element or the output gear and said fixed bearing. Since the second element or the output gear connected thereto for conjoint rotation—as explained at the outset—forms the output side of the planetary gear transmission, greater operating forces can act here in the axial direction on the second element or the output gear connected thereto for conjoint rotation, so that the fixing of the second element or the output gear connected thereto for conjoint rotation to the housing via the fixed bearing in the axial direction enables particularly safe and compact support of the forces occurring during operation—in particular axial forces. Thus, this construction is particularly preferred if—as in an advantageous variant—an output gearing, particularly preferably a helical gearing, is provided on the second element or the output gear.

Based on the above-described embodiment, in a further preferred embodiment of the drive train according to the invention, the first element or the third element of the planetary gear transmission is mounted on the housing so as to be axially movable via a floating bearing, wherein the floating bearing can be, for example, a radial bearing and/or a rolling bearing. The axial movability ensured via the floating bearing takes into account the axial play between the first element or the third element on the one hand and the second element on the other hand.

In a further preferred embodiment of the drive train according to the invention, the output gearing on the second element or the output gear and the fixed bearing are arranged in a nested fashion in the radial direction in order to achieve not only a particularly compact construction, but rather also a secure support of both radial forces and also axial forces acting on the second element or the output gear.

In an advantageous embodiment of the drive train according to the invention, the fixed bearing and/or the floating bearing is designed as a radial bearing and/or rolling bearing.

According to a further advantageous embodiment of the drive train according to the invention, the first element has an input gearing in which, for example, the output gearing of the aforementioned electric motor or other drive can engage. The input gearing is preferably designed as a plug-in gearing in order to be able to create the connection between the planetary gear transmission on the one hand and the electric motor or the drive unit on the other hand quickly and securely. Irrespective of the construction of the input gearing, the input gearing is arranged in a nested fashion in the radial direction with the fixed bearing and/or the aforementioned output gearing in order to achieve a compact construction on the one hand and a secure support of the occurring forces on the other hand.

According to a further advantageous embodiment of the drive train according to the invention, the braking device and the clutch device are arranged on the side of the planetary gear transmission facing away from the fixed bearing in the axial direction, in order to enable simple assembly and disassembly of the drive train and to be able to arrange and supply any provided actuating devices for the braking device and clutch device compactly in one region of the drive train.

In a further advantageous embodiment of the drive train according to the invention, the clutch device is hydraulically operable. In this case, in order to actuate the clutch device accordingly, it is preferred if a pressure medium can be supplied to the clutch device via a pressure line in a first housing portion of the housing, via a rotary feedthrough between the first housing portion and the third element of the planetary gear transmission, and via a first line in the third element. In this context, it has been found to be advantageous if a further rotary feedthrough is provided between the third element and the first or second element, via which the pressure medium can reach its destination. In any case, in this embodiment, the components of the planetary gear transmission and the stationary housing are used equally to transport the pressure medium therein, whereby no additional components are required and the pressure medium can be supplied over a relatively short path, thus simplifying the handling of the clutch device.

In a further preferred embodiment of the drive train according to the invention, the clutch device can furthermore be supplied with a pressure compensation medium and/or cooling medium via a fluid line in the first housing portion and a second line in the third element, in order to be able to supply the pressure compensation medium and/or cooling medium over a particularly short and simple path.

According to a particularly advantageous embodiment of the drive train according to the invention, the third element is supported on the first housing via the floating bearing. Since the floating bearing does not have to or is unable to absorb axial forces, it can be arranged between a portion of the third element, which has a particularly small outer diameter, and the first housing portion, whereby the first housing portion itself also only has to have a small diameter in this region, in which the rotary feedthrough can also be provided between the first housing portion and the third element. In this way, the rotary feedthrough is also provided on a relatively small diameter, whereby small sealing diameters are achieved, which lead to a correspondingly low leakage. Consequently, the arrangement of the rotary feedthrough and of the floating bearing between the third element on the one hand and the same first housing portion on the other hand ensures a high degree of functional reliability. Thus, the outer radius of the third element on which the floating bearing is supported or the rotary feedthrough is provided is preferably smaller than the outer radius of the second element or the output gear on which the fixed bearing interacts with the second element or the output gear, said outer radius of the third element being particularly preferably less than half of the other outer radius.

In another particularly preferred embodiment of the drive train according to the invention, the second element or the output gear connected thereto for conjoint rotation is supported via the fixed bearing on a second housing portion of the housing, which is arranged on the side of the planetary gear transmission facing away from the first housing portion. This results in a particularly expedient division of the functional regions insofar as the forces occurring during operation are supported substantially in the region of the second housing portion, whereas the hydraulic actuation, cooling and/or lubrication of the clutch or braking device, for example, can take place via the first housing portion.

In a further advantageous embodiment of the drive train according to the invention, the first housing portion and the second housing portion are designed as housing portions that can be detached from each other. In this case, said housing portions are preferably designed to be detachable from one another in the axial direction. In any case, the detachable arrangement of the housing portions allows for simplified assembly and disassembly.

In a further advantageous embodiment of the drive train according to the invention, the first housing portion is designed in such a way that it completely closes the housing in the axial direction in order to be able to securely retain a cooling and/or lubricating medium arranged therein or to prevent dirt from entering the housing. The second housing portion, on the other hand, has an opening for transmitting the input torque to the input side of the planetary gear transmission, the input side of the planetary gear transmission, namely the first element or a part thereof, preferably extending outwards through the opening in order to be able to be coupled to an electric motor or another drive unit.

In another particularly advantageous embodiment of the drive train according to the invention, the first line within the third element has an annular space portion which is elongate in the axial direction and surrounds the second line radially on the outside. In this way, a particularly compact construction on the one hand and a reliable supply of pressure medium and pressure compensation medium and/or coolant on the other hand can be achieved in a very confined space. It is preferred here if the annular space portion is separated from the inner second line by a sleeve inserted into a recess of the third element, with the sleeve, which is initially separate prior to installation, enabling particularly simple production of the first and second lines within the third element. For example, the sleeve can be pressed into the recess of the third element in at least one axial direction in order to lie tightly against the third element in this axial direction. On the other hand, in this embodiment it is preferred if the annular space portion is sealed by an annular sealing element in an axial direction, which is preferably opposite the previously mentioned press-in direction. Here, too, the annular sealing element, which is initially formed separately, enables simple sealing of the annular space portion in at least one of the two axial directions. Alternatively, the annular sealing element can first be attached to the sleeve in order to subsequently insert the sleeve together with the annular sealing element into the recess within the third element. A one-piece design of the sleeve with an annular sealing element, which would then protrude in the radial direction over the sleeve, would also be possible in principle.

In a further advantageous embodiment of the drive train according to the invention, the first element is the planet carrier. The planet carrier preferably has an input hub with the input gearing. The input gearing is preferably formed as an internal toothing. The internal toothing can function, for example, as the previously mentioned plug-in gearing, in which an output gearing of the electric motor or another input unit is plugged into the internal toothing of the input hub of the planet carrier.

According to a further advantageous embodiment of the drive train according to the invention, the second element is the ring gear of the planetary gear transmission. Insofar as an output gear is provided, which is connected to the ring gear for conjoint rotation, this output gear is preferably supported on the input hub of the planet carrier by means of a radial bearing and/or an axial bearing, this being particularly preferably achieved by nesting the radial bearing in the radial direction with the fixed bearing in order to achieve a particularly accurate support of the first element in the form of the planet carrier indirectly via the radial bearing, the output gear and the fixed bearing on the housing or the second housing portion.

In a further advantageous embodiment of the drive train according to the invention, the third element is the sun gear of the planetary gear transmission. The sun gear is preferably supported via a radial bearing and/or an axial bearing on the input hub of the planet carrier. Alternatively or additionally, the sun gear forming the third element comprises an elongate sun gear hub, which may also be referred to as a sun gear shaft, it being particularly preferred that the sun gear is supported on the first housing portion via the sun gear hub and the floating bearing. As already previously stated, it is preferred if the rotary feedthrough is formed between the first housing portion and the sun gear hub of the sun gear, wherein accordingly the aforementioned first and second lines can or should also be formed within the third element within the sun gear hub.

In a further advantageous embodiment of the drive train according to the invention, the drive train further comprises the aforementioned electric motor for driving the input side of the planetary gear transmission. The electric motor is preferably an electric machine, which can therefore be operated not only as a motor, but also as a generator.

In a further advantageous embodiment of the drive train according to the invention, the clutch device is a multiple disc clutch, whereas the braking device is alternatively or additionally a multiple disc brake.

In a further advantageous embodiment of the drive train according to the invention, the braking device, preferably the braking device designed as a multiple disc brake, can be actuated hydraulically. In this case, it is preferred if the braking device is assigned a pressure space which can be supplied with a corresponding hydraulic pressure medium in order to actuate the braking device. This pressure space can preferably be supplied with the pressure medium via a further pressure line in the first housing portion.

According to a further preferred embodiment of the drive train according to the invention, the braking device can be supplied via a further fluid line in the first housing portion with a cooling medium, which can, for example, be supplied to the multiple disc pack of the braking device designed as a multiple disc brake.

In a particularly advantageous embodiment of the drive train according to the invention, the pressure space of the braking device is delimited in one radial direction, optionally in both radial directions, by a pressure space wall, the pressure space wall being formed in one piece with the first housing portion. Furthermore, in this embodiment it is preferred if the pressure space is delimited in one of the two axial directions by the first housing portion itself. Furthermore, it is preferred if the pressure space is annular. Thanks to the one-piece design of at least one pressure space wall with the first housing portion, a particularly compact structure is achieved, and furthermore the supply of the hydraulic pressure medium into the pressure space is possible over a particularly short path and therefore in a simple way.

BRIEF DESCRIPTION OF THE DRAWING

The invention is explained in more detail below using exemplary embodiments with reference to the attached drawing. The sole FIGURE shows a partial side view of a drive train for a motor vehicle in sectional view.

DETAILED DESCRIPTION

Figure 1:
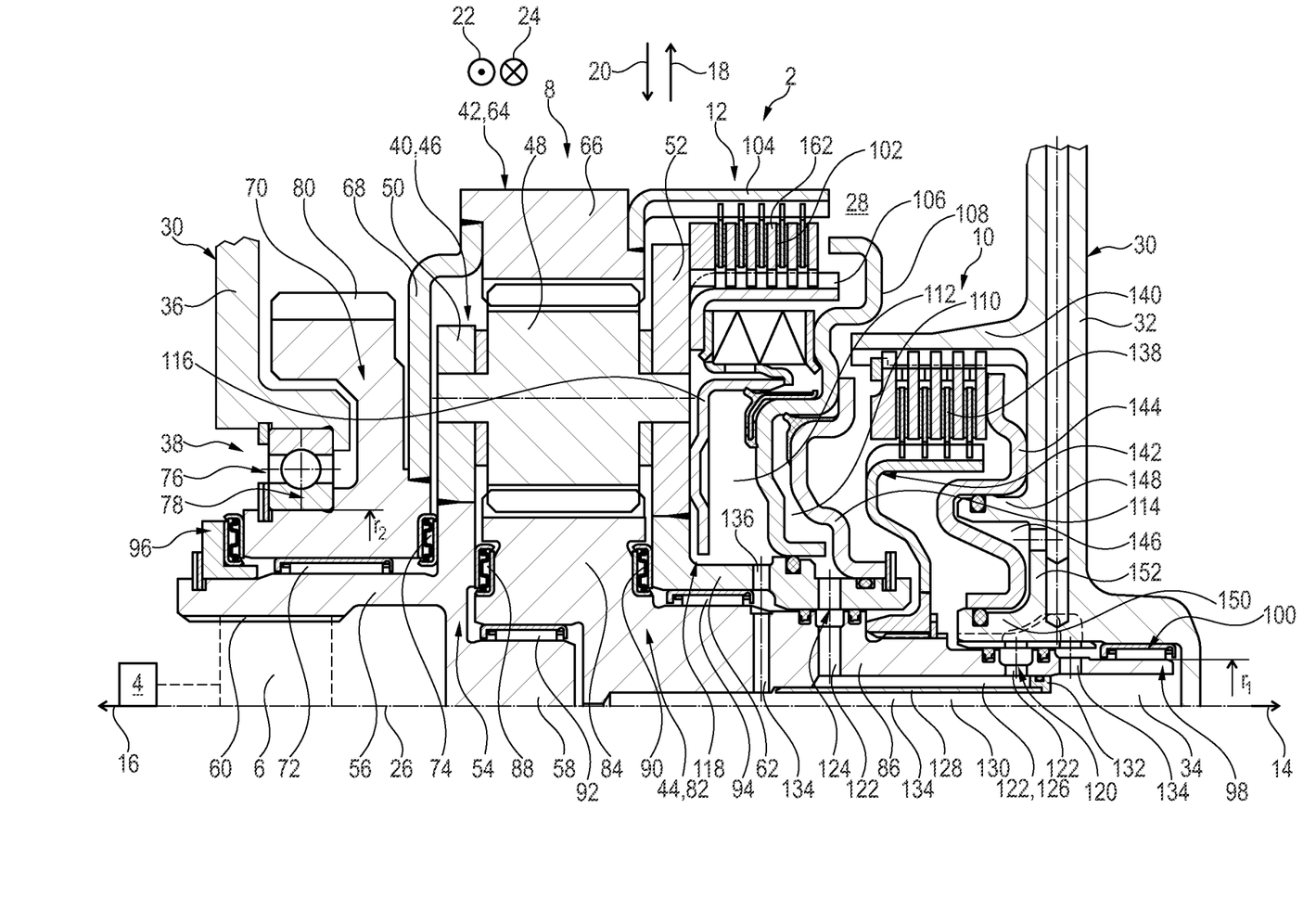

The FIGURE shows a partial representation of a drive train 2 for a motor vehicle. A drive train 2 for a motor vehicle driven by an electric motor is shown by way of example, so that the drive train 2 also has an at least schematically indicated electric motor 4 with an output side 6. The electric motor 4 is designed as an electric machine so that it can be operated on the one hand as a motor or drive and on the other hand as a generator. Also, the drive train 2 comprises a planetary gear transmission 8, a braking device 10 and a clutch device 12, which will be described in greater detail later, wherein the mutually opposed axial directions 14, 16, the mutually opposed radial directions 18, 20 and the mutually opposed circumferential directions 22, 24 of the planetary gear transmission 8, the braking device 10 and the clutch device 12 are indicated by means of corresponding arrows and said devices are at least partially rotatable about an axis of rotation 26 extending in the axial directions 14, 16.

The aforementioned devices, specifically the planetary gear transmission 8, the braking device 10 and the clutch device 12, are arranged in the interior 28 of a stationary housing 30. The stationary housing 30 is therefore not rotatable about the axis of rotation 26, but is of stationary design. The housing 30 is composed of at least two housing portions. For example, in the embodiment shown, the housing 30 has a first housing portion 32, which delimits the interior 28 in the axial direction 14, and, in the region of the axis of rotation 26, has an indentation 34, which is set back in the axial direction 14 and within which a rotatable component can be mounted rotatably about the axis of rotation 26, as will be explained in greater detail later. In addition, the stationary housing 30 has a second housing portion 36, which delimits the interior 28 in the axial direction 16. However, in the second housing portion 36, which is arranged opposite the first housing portion 32 in the axial direction 14, 16, there is no indentation formed, but rather an opening 38, via which an input torque can be transmitted from the electric motor 4 to the input side (described in greater detail later) of the planetary gear transmission 8. Thus, the first housing portion 32 completely closes the housing 30 or the interior 28 in the axial direction 14, whereas the second housing portion 36 does not do so due to the presence of the opening 38, although the opening 38 is preferably sealed. The first housing portion 32 and the second housing portion 36 are formed as housing portions 32, 36 of the housing 30 which can be detached from each other, wherein the first and second housing portions 32, 36 can be detachably arranged on each other both directly and indirectly, for example via a further housing portion. Due to the accommodation of the planetary gear transmission 8 within the interior 28 of the housing 30, the first housing portion 32 is arranged on the side of the planetary gear transmission 8 facing away from the second housing portion 36, whereas the second housing portion 36 is arranged on the side of the planetary gear transmission 8 facing away from the first housing portion 32.

The planetary gear transmission 8 has a conventional construction with three elements. Thus, the planetary gear transmission 8 has a first element 40, which forms an input side of the planetary gear transmission 8, via which the input torque of the electric motor 4 can be introduced into the planetary gear transmission 8, a second element 42, which forms an output side of the planetary gear transmission 8, via which an output torque of the planetary gear transmission 8 can be supplied to a subsequent component, preferably a differential, and a third element 44. The third element 44 can be electively fixed to the first housing portion 32 of the housing 30 by means of the braking device 10, whereas, by means of the clutch device 12, two of the elements 40, 42, 44, in the embodiment shown the first element 40 and the second element 42, can be electively fixed to each other in such a way that they can no longer rotate relative to each other and the planetary gear transmission 8 performs a so-called block rotation.

In the embodiment shown, the first element 40 of the planetary gear transmission 8 is a planet carrier 46 with at least one planet gear 48. The planet carrier 46 has two support portions 50, 52 spaced from one another in the axial direction 14, 16, on and between which the at least one planet gear 48 is rotatably arranged. The support portions 50, 52 extend substantially in the radial directions 18, 20, with the support portion 50 arranged adjacently to the planet gear 48 in the axial direction 16 extending inwardly in the radial direction 20 to an input hub 54, which is formed as the input hub of the planetary gear transmission 8.

The input hub 54 is composed substantially of a tubular portion 56 and a pin-shaped portion 58 projecting in the axial direction 14, which has a smaller outer diameter than the tubular portion 56. The input hub 54 also has an input gearing 60 which is formed as an internal toothing in the tubular portion 56, i.e. as a toothing on its inwardly facing side in the radial direction 20. Thus, it can be generally said that the first element 40 in the form of the planet carrier 46 has an input gearing 60 in the form of the internal toothing on the tubular portion 56 of the input hub 54 of the planet carrier 46, the input gearing 60 forming, together with the output side 6 of the electric motor 4, a plug-in gearing which is produced by plugging the output side 6 of the electric motor 4 into the input gearing 60 formed as an internal toothing. The input gearing 60 is preferably formed as a straight gearing, with this applying correspondingly to an associated gearing on the output side of the electric motor 4, which is preferably formed by a gearwheel. The support portion 50 is welded to the input hub 54.

The support portion 52, on the other hand, extends further outward in the radial direction 18 than the support portion 50 and further inward in the radial direction 20 to a tubular support hub 62, which will be discussed in greater detail later, with the support portion 52 preferably being welded to the support hub 62.

The second element 42 is formed by a ring gear 64 of the planetary gear transmission 8, wherein the toothing of the ring gear 64 pointing inwards in the radial direction 20 engages the toothing of the at least one planet gear 48. The ring gear 64 is substantially composed of an annular portion 66 running circumferentially in the circumferential direction 22, 24 with the toothing for engaging the planet gear 48 and a radial portion 68 extending substantially in the radial direction 18, 20, the radial portion 68 being welded to the annular portion 66 and extending inwardly in the axial direction 16 adjacently to the support portion 50 in the radial direction 20.

As already explained above, the second element 42 in the form of the ring gear 64 forms the output side of the planetary gear transmission 8, wherein the ring gear 64—in the embodiment shown—does not have an output gearing for this purpose, but is rather connected to an output gear 70 for conjoint rotation. Specifically, the radial portion 68 of the ring gear 64 is connected to the output gear 70 for conjoint rotation in that the radial portion 68 is welded to the output gear 70. The output gear 70 is rotatably supported on the tubular portion 56 of the input hub 54 in the circumferential direction 22, 24 via a radial bearing 72. Furthermore, the output gear 70 is also supported in the axial direction 14 on the input hub 54 or the support portion 50 via an axial bearing 74.

Furthermore, the second element 42 in the form of the ring gear 64, more specifically the output gear 70, to which the second element 42 is connected for conjoint rotation, is fixed to the second housing portion 36 of the housing 30 via a fixed bearing 76 in both axial directions 14, 16. Specifically, the fixed bearing 76 is formed by a rolling bearing 78 for supporting the output gear 70 in the radial direction 20, 18 on the second housing portion 36 of the housing 30, the rolling bearing 78 being fixed both on the output gear 70 and on the second housing portion 36 in the mutually opposed axial directions 14, 16, here by way of example by a step and a securing ring. In this case, the fixed bearing 76 or the rolling bearing 78 and the radial bearing 72 for supporting the output gear 70 on the input hub 54 are arranged in a nested fashion in the radial direction 18, 20. This also applies to the output gearing 80 on the output gear 70, which is designed as a helical gearing and is arranged in a nested fashion with the fixed bearing 76 or the rolling bearing 78 in the radial direction 18, 20.

The third element 44 is a sun gear 82 of the planetary gear transmission 8. The sun gear 82 is substantially composed of the gearing portion 84 running in the circumferential direction 22, 24, of which the toothing pointing outwards in the radial direction 18 engages in the toothing of the at least one planet gear 48, and of a sun gear hub 86 extending from the gearing portion 84 in the axial direction 14. As can be seen from the FIGURE, the gearing portion 84 extends in the radial direction 18 between the support portions 50, 52 and/or the input hub and support hub 54, 62. In this case, the gearing portion 84 of the sun gear 82 is supported via an axial bearing 88 in the axial direction 16 on the input hub 54 and via an opposite axial bearing 90 in the axial direction 14 on the support hub 62. Furthermore, the gearing portion 84 of the sun gear 82 is supported inwardly in the radial direction 20 on the pin-shaped portion 58 of the input hub 54 via a radial bearing 92. Furthermore, the mentioned support hub 62 of the planet carrier 46 is also supported in the radial direction 20 via a radial bearing 94 on the sun gear hub 86 of the sun gear 82 extending in the axial direction 14.

It should thus be noted that the output gear 70, which is connected to the ring gear 64 for conjoint rotation and is also non-displaceably connected to the ring gear 64 with respect to the axial direction 14, 16, is directly fixed to the second housing portion 36 of the housing 30 in the axial direction 14, 16 via the fixed bearing 76, whereas the first element 40 and the third element 44 are indirectly fixed to the stationary housing 30 in the axial direction 14, 16 via the second element 42 or the output gear 70 and the fixed bearing 76. Specifically, the planet carrier 46 is supported on the second housing portion 36 of the housing 30 in the axial direction 16 via the support portion 50, the input hub 54, the axial bearing 74, the output gear 70 and the fixed bearing 76, and is thus fixed in this direction. The sun gear 82, on the other hand, can be supported or fixed on the second housing portion 36 of the housing 30 in the axial direction 16 via its gearing portion 84, the axial bearing 88, the input hub 54, the axial bearing 74, the output gear 70 and the fixed bearing 76. For the sake of completeness, it should also be noted that between the input hub 54 and the output gear 70 there is provided a further support arrangement 96, by means of which the input hub 54 can also be supported in the axial direction 14 on the output gear 70 and is thus also fixed in this axial direction 14.

In addition to the fixed bearing 76, the planetary gear transmission 8 is also supported on the housing 30 in the radial direction 18, 20 via a floating bearing 98. Specifically, the sun gear hub 86 extends in the axial direction 14 into the aforementioned indentation 34 in the first housing portion 32 in order to be axially movably supported by the floating bearing 98 within the indentation 34 on the first housing portion 32 of the housing 30. Similarly to what has been described already for the fixed bearing 76, the floating bearing 98 is also designed as a rolling bearing 100. However, the rolling bearing 100 is preferably formed as a needle bearing, whereas the rolling bearing 78 is formed as a ball bearing. Also, the roller bearing 100 is supported on the sun gear hub 86 on a radius $r_1$ which is smaller than a radius $r_2$ on which the roller bearing 78 is supported on the output gear 70. This provides a particularly secure support in the region of the fixed bearing 76, whereas the support via the floating bearing 98 can take place on a relatively small radius $r_1$. The latter is also advantageous insofar as the supply of pressure, lubricating or cooling medium in the region of the sun gear hub 86 and the first housing portion 32, described in greater detail later, can take place on the relatively small radius $r_1$, whereby leakage losses in particular can be avoided, which in turn ensures safe and trouble-free operation when transferring the planetary gear transmission 8 into its two gear stages.

The braking device 10 and the clutch device 12 are arranged in relation to the axial directions 14, 16 on the side of the planetary gear transmission 8 facing away from the fixed bearing 76 in the axial direction, thus next to the planetary gear transmission 8 in the axial direction 14. Moreover, both the braking device 10 and the clutch device 12 can be actuated hydraulically, the clutch device 12 being formed by a multiple disc clutch and the braking device 10 being formed by a multiple disc brake. Both the braking device 10 and the clutch device 12 are supplied with a pressure medium correspondingly via the first housing portion 32, but not via the second housing portion 36.

The clutch device 12, which is designed as a multiple disc clutch, has a multiple disc pack 102 with alternately successive inner and outer discs. In addition, the clutch device 12 has a tubular outer multiple disc support portion 104, which extends substantially in the axial directions 14, 16 and is in rotary driving connection with the outer discs of the multiple disc pack 102, the outer multiple disc support portion 104 leading in the axial direction 16 to the annular portion 66 of the ring gear 64, to which the outer multiple disc support portion 104 is directly fastened, here by way of example by means of a weld. Consequently, an outer multiple disc support of the clutch device 12 is created in a particularly simple manner, especially since the annular portion 66 and the radial portion 68, in conjunction with the output gear 70, provide support for the outer multiple disc support portion 104 in the radial direction 18, 20, without the need for an additional support portion, as a result of which the clutch device 12 or the drive train 2 can have a particularly compact design.

Similarly, the multiple disc pack 102 has, associated therewith, an inner multiple disc support portion 106, which is substantially tubular in shape and extends in the axial directions 14, 16, the inner multiple disc support portion 106 being in rotational driving engagement with the inner discs of the multiple disc pack 102. In the axial direction 16, the inner multiple disc support portion 106 leads directly to the support portion 52 of the planet carrier 46, to which the inner multiple disc support portion 106 is fastened for conjoint rotation, where appropriate by welding. Consequently, a support portion for radial support of the inner multiple disc support portion 106 can also be spared here, especially since the radial support is provided via the support portion 52 and the support hub 62 of the planet carrier 46.

The multiple disc pack 102 is assigned an actuating piston 108, which is displaceable in the axial direction 14, 16 and which is guided sealingly along the side of the support hub 62 facing outwards in the radial direction 18, the actuating piston 108 being assigned on the one hand a pressure space 110 and on the other hand a pressure compensation space 112. The pressure space 110 is delimited by the actuating piston 108, a wall 114 fixed to the support hub 62 in the axial direction 14, 16, and inwardly by the support hub 62 in the radial direction 20. The pressure compensation space 112, on the other hand, is delimited by the actuating piston 108, the support hub 62 and a further wall 116, an overflow opening 118 being provided between the wall 116 and the planet carrier 46, via which a pressure compensation medium can flow outwards in the radial direction 18 within the pressure compensation space 112 as far as the multiple disc pack 102 and can provide cooling and/or lubrication there.

In order to be able to supply a pressure medium to the pressure space 110, various lines for a corresponding hydraulic fluid are provided. For example, the pressure space 110 can be supplied with the pressure medium via a pressure line (no reference sign) in the wall of the first housing portion 32 of the housing 30, a rotary feedthrough 120 between the first housing portion 32 and the sun gear hub 86, a first line 122 in the sun gear hub 86, and a further rotary feedthrough 124 between the sun gear hub 86 and the support hub 62. The first line 122 has an advantageously elongate annular space portion 126 in the axial direction 14, 16, which runs in the circumferential direction 22, 24. The annular space portion 126 is delimited inwardly in the radial direction 20 by a sleeve 128, which is inserted into a central recess 130 within the sun gear hub 86, wherein the recess 130 can be formed, for example, by an axial indentation in the sun gear hub 86. Alternatively, the sun gear hub 86 may also be completely tubular in order to have said inner recess 130. The sleeve 128 is inserted into the recess 130 in the axial direction 16 such that the annular space portion 126 is sealed in the axial direction 16, whereas the annular space portion 126 is sealed in the opposite axial direction 14 by an annular sealing element 132 which closes the annular gap between the sleeve 128 on the one hand and the inner side of the recess 130 in the sun gear hub 86 on the other hand. The annular sealing element 132 can in principle be formed in one piece with the sleeve 128, but an initially separately formed sealing element 132, which is subsequently attached to the sleeve 128 and/or the sun gear hub 86, is equally possible, if not advantageous.

Furthermore, the pressure compensation space 112 can be supplied with a pressure compensation medium or a cooling medium via a fluid line (no reference sign) in the wall of the first housing portion 32 of the housing 30 and a second line 134 in the sun gear hub 86. Here, a part of the second line 134 extends inside the sleeve 128, which thus separates the annular space portion 126 of the first line 122 from the at least partially inner second line 134 and seals them with respect to each other. The FIGURE further shows that the second line 134 in the sun gear hub 86 further leads to an opening 136 in the support hub 62, so that the pressure compensation and/or cooling medium exiting the second line 134 can enter the pressure compensation space 112 via the opening 136. Whereas the two rotary feedthroughs 120, 124 are characterised in that they are sealed in the mutually opposed axial directions 14, 16 by corresponding sealing elements, this is not necessary at the transition between the fluid line in the first housing portion 32 and the second line 134 as well as between the second line 134 and the opening 136 in the support hub 62, especially since the medium flowing therein serves only for pressure compensation or cooling and/or lubrication.

The braking device 10, which is in the form of a multiple disc brake, has a multiple disc pack 138, the multiple disc pack 138 being assigned an outer multiple disc support portion 140, which is of substantially tubular design, extends in the axial directions 14, 16 and is in rotary driving engagement with the outer multiple discs of the disc pack 138. In the embodiment shown, the outer multiple disc support portion 140 is advantageously formed in one piece with the first housing portion 32 of the stationary housing 30, so that a particularly small outer multiple disc support with connection to the housing 30 is realised over the shortest possible path. This achieves a particularly compact construction. In addition, the multiple disc pack 138 is associated with an inner multiple disc carrier 142, which has an inner multiple disc support portion in rotational driving engagement with the inner discs of the multiple disc pack 138 and a radial support portion extending inwardly in the radial direction 20, which at its end pointing inwardly in the radial direction 20 is in rotational driving engagement with the sun gear hub 86, and thus with the third element 44 of the planetary gear transmission 8. It is thus possible to fix the third element 44, in this case the sun gear 82, to the first housing portion 32 of the stationary housing 30 via the braking device 10.

An actuating piston 144 is associated with the multiple disc pack 138, which is guided on the first housing portion 32 of the housing 30 so as to be displaceable in the axial direction 14, 16. The actuating piston 144, by means of which the multiple disc pack 138 can be compressed, is assigned a pressure space 146, which is itself of stationary design and thus does not rotate in the circumferential directions 22, 24, as is the case with the pressure space 110 of the clutch device 12. Consequently, a pressure compensation space can also be spared here, especially since no centrifugal compensation is required. In order to achieve a stationary pressure space 146, this is formed within the first housing portion 32 of the stationary housing 30. Specifically, the pressure space 146 is delimited outwardly in the radial direction 18 by a first pressure space wall 148, inwardly in the radial direction 20 by a second pressure space wall 150, and in the axial direction 14 by a third pressure space wall 152, all three pressure space walls 148, 150, 152 being formed in one piece with the first housing portion 32. The pressure space 146 itself is annular and is substantially delimited in the axial direction 16 by the actuating piston 144.

The pressure space 146 of the braking device 10 can be supplied with the pressure medium via a further pressure line (no reference sign) in the wall of the first housing portion 32. In addition, a further fluid line is advantageously provided in the wall of the first housing portion 32, which can in principle also correspond to the fluid line for supplying the pressure compensation or cooling medium to the clutch device 12 in order to supply the multiple disc pack 138 of the braking device 10 with a cooling medium.

LIST OF REFERENCE NUMERALS 2 drive train
4 electric motor
6 output side
8 planetary gear transmission
10 braking device
12 clutch device
14 axial direction
16 axial direction
18 radial direction
20 radial direction
22 circumferential direction
24 circumferential direction
26 axis of rotation
28 interior
30 housing
32 first housing portion
34 indentation
36 second housing portion
38 opening
40 first element
42 second element
44 third element
46 planet carrier
48 planet gear
50 support portion
52 support portion
54 input hub
56 tubular portion
58 pin-shaped portion
60 input gearing
62 support hub
64 ring gear
66 annular portion
68 radial portion
70 output gear
72 radial bearing
74 axial bearing
76 fixed bearing
78 rolling bearing
80 output gearing
82 sun gear
84 gearing portion
86 sun gear hub
88 axial bearing
90 axial bearing
92 radial bearing
94 radial bearing
96 support arrangement
98 floating bearing
100 rolling bearing
102 multiple disc pack
104 outer multiple disc support portion
106 inner multiple disc support portion
108 actuating piston
110 pressure space
112 pressure compensation space
114 wall
116 wall
118 overflow opening
120 rotary feedthrough
122 first line
124 rotary feedthrough
126 annular space portion
128 sleeve
130 recess
132 sealing element
134 second line
136 opening
138 multiple disc pack 140 outer multiple disc support portion
142 inner multiple disc carrier
144 actuating piston
146 pressure space
148 first pressure space wall
150 second pressure space wall
152 third pressure space wall
$r_1$ radius
$r_2$ radius

What is claimed is:

1. A drive train for a motor vehicle, the drive train comprising:
a planetary gear transmission with three elements, specifically a sun gear, a planet carrier with at least one planet gear, and a ring gear, of which a first element forms an input side of the planetary gear transmission, via which the input torque of an electric motor can be introduced into the planetary gear transmission, a second element forms an output side of the planetary gear transmission, and a third element can be electively fixed to a stationary housing via a braking device, wherein the drive train further comprises a clutch device, by means of which two of the elements can be electively fixed to one another in such a way that the planetary gear transmission performs a block rotation, and wherein the clutch device is hydraulically actuatable, the clutch device being supplied with a pressure medium via a pressure line in a first housing portion of the housing, a rotary feedthrough between the first housing portion and the third element, and a first line in the third element, and/or being supplied with a pressure compensation medium and/or cooling medium via a fluid line in the first housing portion and a second line in the third element, the third element being supported on the first housing portion.

2. The drive train according to claim 1, wherein:
the second element or an output gear connected thereto for conjoint rotation is fixed to the housing in the axial direction via a fixed bearing, and the first and third elements are indirectly fixed to the stationary housing in the axial direction via the second element or the output gear and the fixed bearing, and
an output gearing is provided on the second element or the output gear.

3. The drive train according to claim 2, wherein at least one of:
the output gearing and the fixed bearing are arranged in a nested fashion in the radial direction,
at least one of the fixed bearing and a floating bearing is designed as a rolling bearing,
the first element has an input gearing, which is arranged in a nested fashion with at least one of the fixed bearing and the output gearing in the radial direction, and
the braking device and the clutch device are arranged on the side of the planetary gear transmission facing away from the fixed bearing in the axial direction.

4. The drive train according to claim 2, wherein the third element is mounted on the housing via a floating bearing so as to be axially movable.

5. The drive train according to claim 1, wherein the first element is the planet carrier having an input hub with the input gearing.

6. The drive train according to claim 5, wherein the input gearing is formed as an internal toothing.

7. The drive train according to claim 1, wherein the second element is the ring gear, and wherein an output gear, which is connected to the ring gear for conjoint rotation, is supported on an input hub via a radial bearing and/or an axial bearing.

8. The drive train according to claim 7, wherein the output gear is supported on the input hub via the radial bearing with the radial bearing nested in the radial direction with a fixed bearing.

9. The drive train according to claim 1, wherein the third element is the sun gear which is supported on an input hub via a radial bearing and/or an axial bearing.

10. The drive train according to claim 1, wherein at least one of:
the electric motor is provided for driving the input side of the planetary gear transmission,
the clutch device is a multiple disc clutch,
the braking device is a multiple disc brake, and
the braking device is hydraulically actuatable.

11. The drive train according to claim 1, wherein the third element is mounted on the housing via a floating bearing so as to be axially movable.

12. The drive train according to claim 1, wherein the clutch device is supplied with a pressure medium via a pressure line in a first housing portion of the housing, wherein a pressure space of the braking device is configured to be supplied with a pressure medium via a further pressure line in the first housing portion, and/or the braking device is configured to be supplied with a cooling medium via a further fluid line in the first housing portion, and wherein the pressure space is delimited by a pressure space wall which is formed in one piece with the first housing portion.

13. The drive train according to claim 1, wherein the second element or the output gear connected thereto for conjoint rotation is supported via the fixed bearing on a second housing portion of the housing, wherein the second housing portion is arranged on the side of the planetary gear transmission facing away from the first housing portion, and wherein the second housing portion has an opening for transmitting the input torque to the input side of the planetary gear transmission.

14. The drive train according to claim 13, wherein the first and second housing portions are detachable from one another and/or the first housing portion completely closes the housing in the axial direction.

15. The drive train according to claim 1, wherein the first line has an annular space portion which is elongate in the axial direction and surrounds the second line radially on the outside, the annular space portion being separated from the inner second line by a sleeve inserted into a recess of the third element.

16. The drive train according to claim 15, wherein the annular space portion is sealed off in an axial direction by an annular sealing element.

17. The drive train according to claim 1, wherein the third element is the sun gear, and the sun gear has an elongate sun gear hub and is supported on the first housing portion via the sun gear hub and the floating bearing.

18. The drive train according to claim 17, wherein the rotary feedthrough is formed between the first housing portion and the sun gear hub.

19. A drive train for a motor vehicle, the drive train comprising:
a planetary gear transmission with three elements, specifically a sun gear, a planet carrier with at least one planet gear, and a ring gear, of which a first element forms an input side of the planetary gear transmission, via which the input torque of an electric motor can be introduced into the planetary gear transmission, a second element forms an output side of the planetary gear transmission, and a third element can be electively fixed to a stationary housing via a braking device, wherein the drive train further comprises a clutch device, by means of which two of the elements can be electively fixed to one another in such a way that the planetary gear transmission performs a block rotation, wherein the first element is the planet carrier having an input hub with the input gearing, and wherein the input gearing is formed as an internal toothing.

* * * * *